Aug. 6, 1940.   F. BOHLE   2,210,848
RIFLING TOOL
Filed Sept. 23, 1939   2 Sheets-Sheet 2
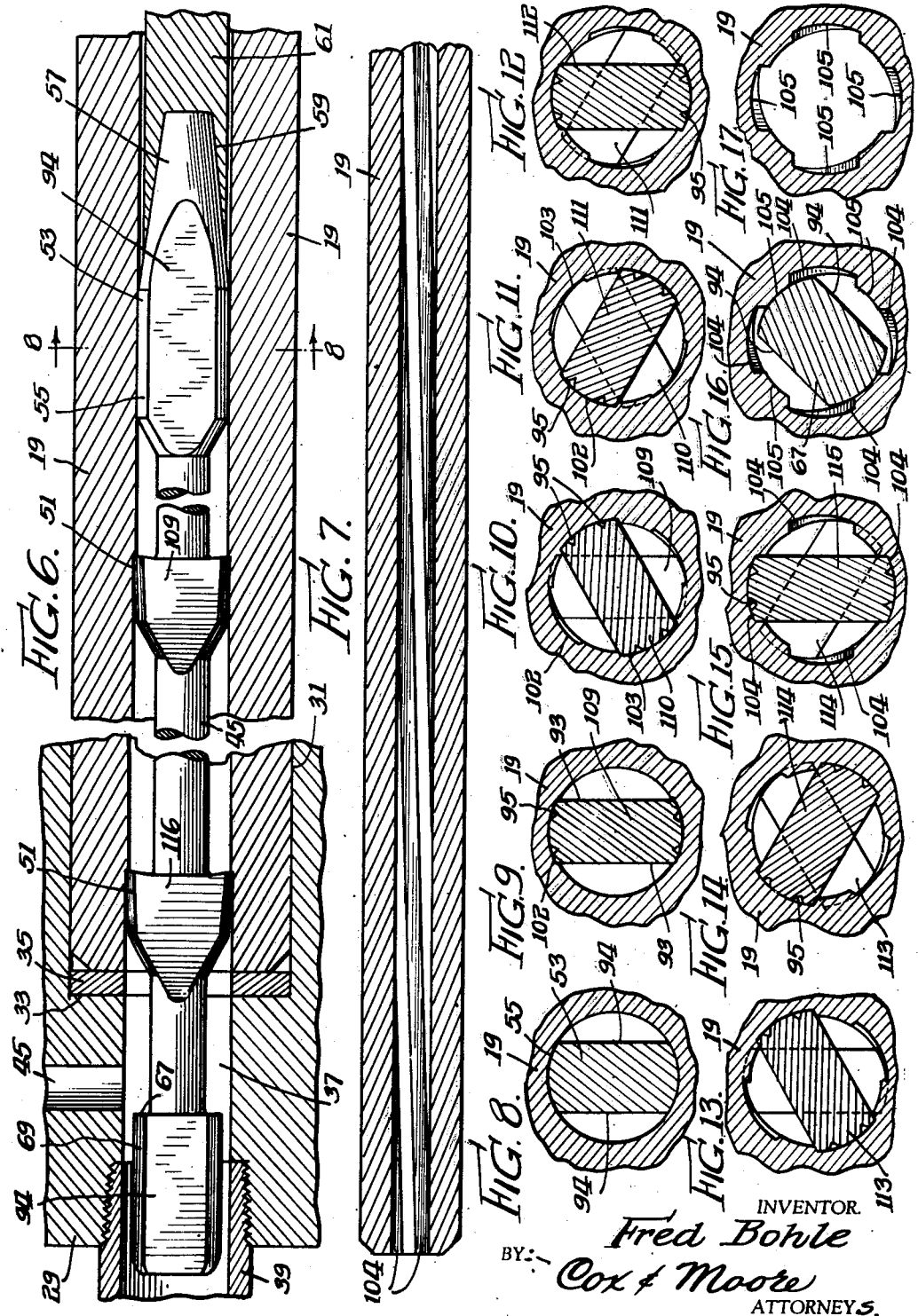
INVENTOR.
Fred Bohle
BY Cox & Moore
ATTORNEYS.

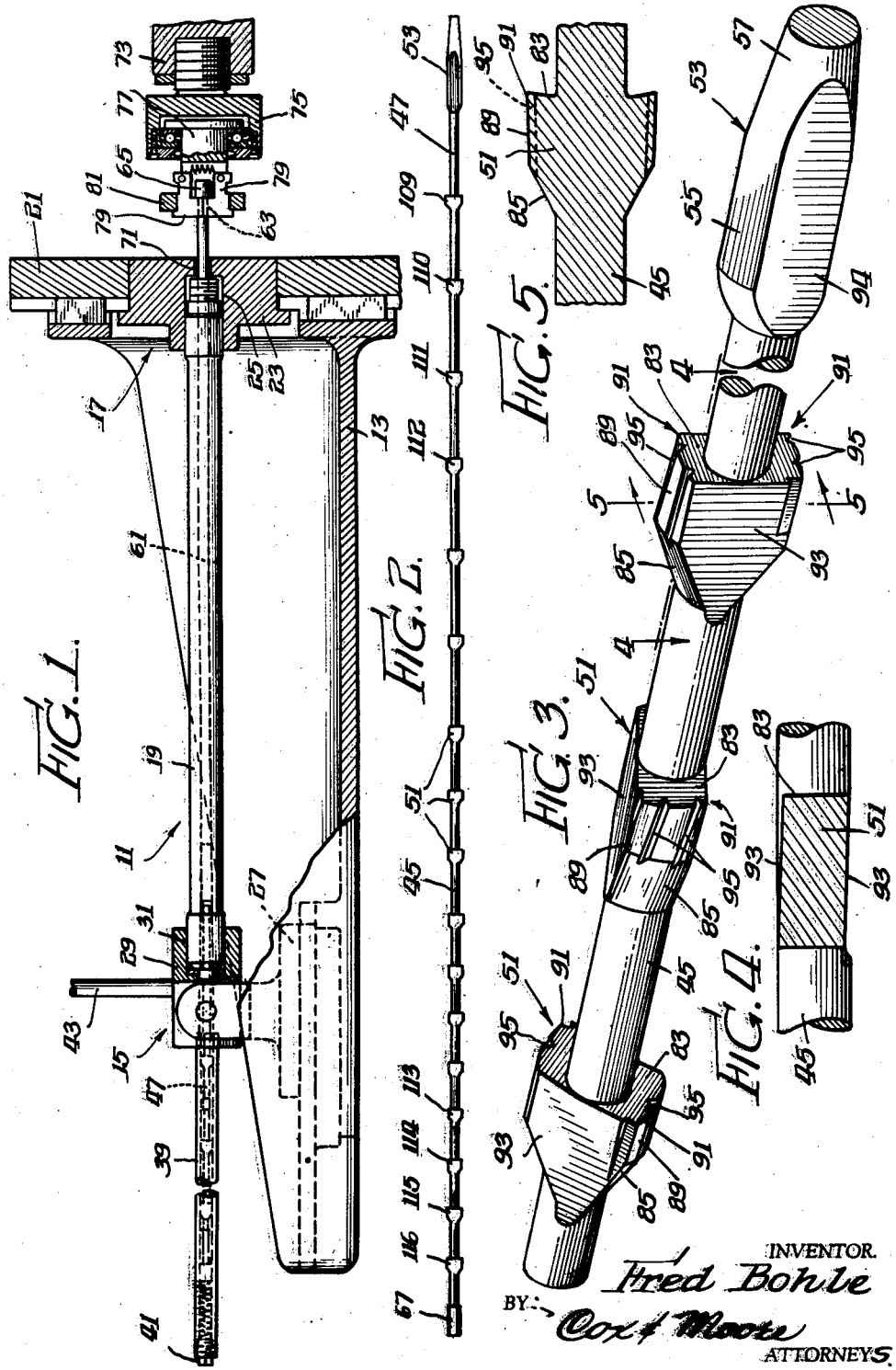

Patented Aug. 6, 1940

2,210,848

UNITED STATES PATENT OFFICE 2,210,848

RIFLING TOOL

Fred Bohle, Chicago, Ill., assignor to Illinois Tool Works, Chicago, Ill., a corporation of Illinois Application September 23, 1938, Serial No. 231,363

4 Claims. (Cl. 90—28.1)

My invention relates in general to ballistics and has more particular reference to a rifling tool for cutting the grooves formed in gun barrels and commonly designated as "rifling."

An important object of the invention is to provide a tool for cutting a ring groove to a desired finished groove depth with a single operating stroke of the tool.

Another important object of the invention is to provide a tool for cutting all of the rifling grooves in a barrel simultaneously so that the rifling operation may be performed with a single cutting stroke.

Another important object is to provide a tool of the character mentioned having a plurality of cutter portions relatively angularly displaced on the tool whereby a plurality of relatively displaced grooves may be cut in a barrel simultaneously.

Another important object is to provide a tool of the character mentioned having a plurality of groove cutting portions successively arranged on the tool, each succeeding cutter portion being formed to increase the depth of a groove cut by the preceding cutter portion, whereby the tool may be utilized to form a rifle groove in a barrel to a desired finished depth during a single operating stroke of the tool; a further object being to arrange the successive groove cutting portions of the tool helically with respect to the tool whereby rifle grooves formed by the tool may have helical configuration.

Another important object is to provide a tool of the character mentioned having groove cutting portions comprising knife edges and depressed faces intermediate the knife edges to afford a space, between said faces and the inner surface of a barrel during the cutting operation, to permit passage of a fluid and chips produced by the cutting operation through the barrel past said cutting portions, whereby cutting fluid may be delivered through the barrel to each of a number of successive cutters formed on the tool.

Another important object is to provide a tool of the character mentioned in which the cutting knives comprise shoulders defined by a tool surface in a plane intersecting the longitudinal axis of the tool and a surface, usually cylindrical, extending parallel with said longitudinal axis; a further object being to provide grooves in said axis-parallel surface and extending from the trailing to the leading edge thereof, which leading edge forms a cutting edge with said intersecting surface whereby cutting fluid may be delivered through said grooves at and to the cutting edge, from the trailing toward the leading edge of the cutter.

Another important object is to provide a cutting tool of the character mentioned comprising an elongated stem having a plurality of enlarged portions formed at spaced intervals on said stem, each of said enlarged portions comprising a plurality, preferably a pair, of spaced groove cutting edges standing outwardly of said stem whereby to cut a plurality of grooves simultaneously in a barrel through which the tool may be drawn; a further object being to arrange at least one of said projections with its cutting edges relatively angularly displaced with respect to the cutting edges of a succeeding cutter forming enlargement, whereby the grooves cut by one enlargement will be displaced, preferably equally in the barrel, with respect to the grooves cut by the other projection; a still further object being to incline the cutting portions of each enlargement to correspond with the inclination of a helical groove to be cut, so that during the cutting operation the tool may be guided and turned by the reaction of the barrel upon the inclined cutters, it being merely necessary to draw the tool through the barrel without applying any turning effort thereto in cutting helical grooves in the barrel.

Yet another important object is to relieve the cutter forming enlargements between the several cutting edges thereof to afford a passageway for cutting fluid along the barrel past said projections from the trailing toward the leading end of the tool in order to deliver the cutting fluid to all of the cutting edges and also to deliver the fluid past said projections and the cutting edges thereof with sufficient velocity to urge chips, produced during the cutting operation, forwardly and away from said cutting edges.

Another important object is to provide, at the trailing end of the tool, a guiding enlargement having cylindrical portions adapted to fit snugly within the barrel and upon the land surfaces thereof intermediate the rifling grooves in order to guide and aline the trailing end of the tool in the barrel.

Among the numerous other important objects of the invention is to provide a self-turning rifling tool that will produce a rifled barrel in finished condition having a plurality of rifle grooves with but a single cutting stroke of the tool, the tool merely requiring to be drawn through the barrel without the application of any turning effort thereto by the tool drawing means; to simplify the rifling operation by the elimination first of the disadvantages, including expense and inaccuracies encountered in classic rifling operations in which each groove is cut separately and by separate progressively deeper strokes of a single cutting tool.

Numerous other objects, advantages and inherent functions of the invention will become apparent as the same is more fully understood from the following description, which, taken in connection with the accompanying drawings, discloses a preferred embodiment of the invention.

Referring to the drawings:

Fig. 1 is a side view, partially in section, of rifling apparatus embodying the tool of my present invention;

Fig. 2 is a general view of the entire tool;

Fig. 3 is an enlarged perspective view of a portion of the tool, revealing the details thereof;

Figs. 4 and 5, respectively, are sectional views taken substantially along the lines 4—4 and 5—5 in Fig. 3;

Fig. 6 is a sectional view taken through the rifling apparatus and a barrel being rifled therein, showing the rifling tool in an intermediate position in the barrel during rifling;

Fig. 7 is a sectional view through a barrel rifled with the tool of my present invention;

Fig. 8 is a sectional view taken substantially along the line 8—8 in Fig. 6, and Figs. 9–17, inclusive, are sectional views taken through the barrel and tool, progressively therealong, during a rifling operation, to illustrate the operation of the tool.

To illustrate my invention I have shown on the drawings an apparatus 11 for rifling gun barrels, the apparatus comprising a main frame 13 having spaced apart mountings 15 and 17 for supporting a gun barrel 19 in position to be rifled. The mounting 17 comprises a support 21 carried by the frame 13 and in turn supporting a mounting block 23 having a cavity 25 for the reception of one end of the barrel 19, which may be, and preferably is, press fitted therein. The mounting 15 preferably comprises a pedestal 27 adjustable on the frame 13 toward and away from the mounting block 23, said pedestal 27 preferably carrying a barrel mounting block 29 having a cavity 31 adapted to receive the other end of the barrel, preferably as a press fit. The bottom of the cavity 31 provides a seat 33 forming an abutment for the end of the barrel, a resilient packing washer 35 being preferably arranged in the seat. The block 29 is formed with a channel 37 communicating the bottom of the cavity 31 with the opposite end of the block, said channel 37 being in line with the bore of the barrel 19 and of somewhat larger size.

The block 29 carries a pipe 39 comprising preferably a length of pipe threaded at one end in the open end of the channel 37 at the back of the block, the other end of the pipe 39 being closed by a removable stopper 41. The block 29 also preferably carries a liquid delivery conduit 43 which communicates with the channel 37 through a duct 45 formed in the block.

Rifling of the barrel 19 is accomplished in accordance with my present invention by passing a tool 47 completely through the barrel, and it is an important object and feature of my present invention to arrange the tool 47 so that the rifling operation will be completed as a result of a single cutting stroke of the tool drawn through the barrel.

The tool 47 comprises an elongated stem 49 having a plurality of cutter forming enlargements 51 at spaced intervals throughout the length of the stem. At its leading end the stem is formed with a head 53 having a cylindrical portion 55 adapted to slidingly fit snugly within the bore of the barrel to be rifled, and a tapered portion 57 adapted to fit into a corresponding socket 59 formed in the end of a draw bar 61. This draw bar preferably comprises a rod of diameter less than the bore of the barrel and formed at one end with the socket 59 and with a necked portion 63 adjacent the other end of the rod and defining a shouldered head 65 at said other end. The tapered portions 57 of the head 53 may be secured in the socket 59 of the draw bar in any suitable fashion, preferably by welding the parts together.

The end of the stem 45 opposite from the head 53 is preferably formed with an enlargement 67 forming a tailpiece, the same comprising a cylindrical portion 69 adapted to slidingly and snugly fit the bore of the barrel 19 so that said cylindrical surfaces 55 of the head and 69 of the tailpiece may support the stem in accurate alinement within the barrel during the rifling operation which is accomplished by the cutting projections when the tool is drawn through the barrel.

The tool, with the draw bar attached, is preferably introduced into the barrel to rifle the same by removing the stopper 41 and then inserting the draw bar and attached cutting tool through the pipe 39 and thence through the barrel. Since the draw bar is of lesser diameter than the bore of the barrel, it may be freely passed therethrough to the position shown in Fig. 1, in which the draw bar is within the as yet uncut barrel, with the head 65 of the bar projecting outwardly of the block 23 through an opening 71 therein in line with the bore of the barrel. In this position the head 53 of the tool is at the end of the barrel supported by the block 29, the balance of the tool being disposed within the pipe 39. The stopper 41 may then be replaced in the end of the pipe to condition the apparatus for the rifling operation.

To draw the tool 47 through the barrel, I provide traction means for attachment to the head 65 of the draw bar, said traction means including a member 73 which may be supported on the frame 13 or an extension thereof for movement in a direction coinciding with the axis of the barrel to be rifled, and suitable power means (not shown) may be provided to so draw the member 73. The member 73 carries a mounting 75 in which is journaled for free rotation a spindle 77, which spindle carries a pair of jaws 79 pivoted thereon in position to close upon the necked portion 63 and the head 65 of the draw bar. These jaws are normally urged towards open position, as by means of a spring, and a clamping ring 81 is provided and slidable on the jaws to a position to retain the same in clamped position, the ring 81 being shiftable to a position releasing the jaws for opening movement under the influence of the spring. Any other suitable traction means, however, may be employed, although I prefer to utilize traction means that will not hamper or in any way restrict or guide or force turning movement of the tool or the draw bar with respect to the barrel 19 during the rifling operation.

While I do not necessarily intend to restrict the invention to a tool for cutting four rifle grooves simultaneously in a barrel, or to a tool in which each of the enlargements 51 comprises a pair of diametrally opposed cutting edges, or to a tool in which successive cutter portions 51 are arranged to form different grooves in the barrel, since it is obvious that other arrangements of the cutter portions 51 may be employed, I have however for the sake of demonstrating the invention, shown a tool in which each of the portions 51 is arranged to cut two diametrally opposite grooves in the barrel. It is obvious, however, that each portion 51 may be arranged to form other than two diametrally opposed grooves. Likewise, in the device illustrated, the portions 51 are arranged so that successive cutters form grooves angularly displaced 90 degrees in the barrel, the successive portions 51 cutting alternate pairs of grooves and all of the portions 51 which operate in one pair of grooves successively increase the cut made in said grooves from the leading toward the trailing end of the tool. It is obvious, however, that other than an alternate cutting arrangement of the portions 51 may be utilized.

In the illustrated embodiment, the portions 51 comprise enlargements formed on the stem 45. These enlargements are of preferably cylindrical configuration defined at the leading end of each enlargement by a surface 83 lying in a plane intersecting the axis of the stem 45 at an angle, preferably a right angle. The trailing end of the enlargement is preferably tapered, as at 85, defining the cylindrical portions 89 between the surface 83 and the tapered portion 85, whereby cutting edges 91 are formed at the intersection of the cylindrical portion 89 with the leading surface 83. As shown in the illustrated embodiment, each cutting portion 51 comprises a pair of cutting edges 91 arranged in diametrically opposite position with respect to the axis of the stem 45, and the extent of the cutting edges 91 is determined by relieving or cutting away the body of the enlargements 51, as at 93.

It will be noted that these relieved surfaces 93 in the illustrated embodiment are made at a slight inclination with respect to the axis of the stem 45 in order that the cutting blades may correspond with the inclination of the helical rifle grooves to be cut in the barrel. As the tool is drawn through the barrel, the inclination of the cutter portions provided by the inclined surfaces 93 at the intersection thereof with the cylindrical portions 89, causes the tool to be self-rotating within the barrel so that the tool guides itself exactly at all times to turn in accordance with the helical inclination of the grooves during the formation thereof.

By cutting away the sides of the enlargements 51 between the spaced cutting edges 91, a passageway is afforded within the barrel, through which a fluid may be delivered from the trailing end of the tool successively past all of the portions 51 in order that the fluid, which is preferably a cutting fluid, may be delivered at the leading faces of the portions 51 in position to be applied at the cutting edges 91. The tailpiece 57 and head 53 likewise are cut away, as at 94, on opposite sides thereof to permit the fluid to flow through the barrel past the head and the tailpiece.

This fluid is delivered through the conduit 43 into the channel 37 and passes thence into the end of the barrel that is supported in the block 29, thence through the barrel past all of the portions 51 and is discharged at the end of the barrel in the block 17.

The cutting fluid is preferably delivered through the barrel under sufficient pressure to cause an apppreciable flow of the fluid through the barrel past the cutting elements, and this flow serves to advance chips, cut from the barrel, away from the cutting edges to maintain the barrel, at the point of cutting, substantially free of chips, the chips being forced forwardly by the flow of cutting fluid toward the trailing edge of the preceding cutting portion 51.

To facilitate the delivery of cutting liquid to the cutting edges 91 and also to aid in freeing said edges of chips, I prefer to form the cylindrical portions 89 with grooves 95 extending in said cylindrical portions from the cutting edge to the tapered portions 85. These grooves are preferably arranged in the surfaces 89 in parallelism with the surfaces 93; that is to say, at an inclination with respect to the axis of the stem 45, corresponding with the inclination of the rifling grooves cut in the barrel. It will be understood that each of the cutter elements 45 removes only a light chip; consequently only a slight land is left in the bottom of the groove formed by any one cutter as a result of the presence of the grooves 95, and I stagger the grooves 95 in successive cutters 51 which operate in the same groove so that the lands provided by the grooves 95 in one cutter member are removed by the succeeding member which operates in the same groove. This is illustrated clearly in Fig. 3, wherein three cutters 51 are shown. These cutters are arranged so that the intermediate cutter operates in one diametrally opposed pair of grooves, while the remaining two cutters operate in the other diametrally opposed and relatively offset grooves, and it will be noted that the grooves 95 in one of these two remaining cutters are relatively offset in the cutting edge with respect to the grooves 95 in the other of said cutters.

It will be noted also that successive cutting elements 51, as shown in Fig. 3, are not necessarily disposed in a 90 degree angular relationship. On the contrary, it is only necessary to form the successive cutters at such an angle as to position a successive cutter 51 in the barrel at the desired angularity with respect to the preceding cutter when the succeeding cutter has been advanced to a position in the barrel opposite that occupied by the preceding cutter at the place of measurement. This relationship between adjacent cutter members is clearly illustrated in Figs. 8 to 17, in which it will be seen that the angular relationship of successive cutters is considerably less than 90 degrees, although in advancing the tool through the barrel, the tool will turn to position the succeeding cutter at all times at right angles with respect to the cut groove formed by a preceding cutting portion 51.

Fig. 8 illustrates the guide head 53 as it travels through the uncut bore 101 of the barrel in advance of the cutting members 51. Fig. 9 illustrates the first or leading cutting element 109, which is shown in section, as it travels through the barrel taking the initial cut 102. Fig. 10 shows this leading cutter element 109 in perspective, with the next succeeding or second cutter portion 110 shown in section, making its initial cut 103, the sections being taken in the direction of travel of the tool through the barrel. Fig. 11 shows the second cutter element 110 in perspective in the cut 103, and the third element 111 in section, in the cut 102. Figs. 12 and 13 show similar successive sections illustrating the relative positions of cutting portions 113 and 114 toward the trailing end of the tool during rifling operations, the successive views illustrating the operation of successive cutters in increasing the depth of the grooves 102 and 103 as the same are cut in the barrel. Fig. 14 is a sectional view through the penultimate cutter 114, and Fig. 15 is a sectional view through the trailing cutter 115, showing the preceding cutter 114 in perspective as they apply the finishing cuts forming the finished grooves 104.

Fig. 16 illustrates the manner in which the guide portion 67 rides upon the lands 105 formed in the bore of the barrel, between the grooves 104, to maintain the trailing end of the tool in concentric alinement with said bore. Fig. 17 is a sectional view showing the bore of the barrel after the rifling operation is completed.

From the foregoing description it will be seen that the tool of my present invention affords a device for cutting a plurality of helical rifle grooves in a barrel with only one operating stroke of the tool. Since all of the cutter elements may be accurately formed on the stem 45 in a fixed relative position, it will be apparent that the accuracy of the rifle grooves formed by the tool is not at all dependent upon accurate setting of tool carrying equipment, but that the position of the grooves is accurately determined by the operation of the tool itself. It will be apparent also that the tool drawing mechanism is of simple construction and not at all complicated by mechanism for accurately turning the tool as it progresses through the barrel, it being merely necessary to draw the tool, which is self-turning, in the barrel in order to accomplish the rifling operation. It will also be seen that I have provided means for affording a continuous flow of cutting fluid to the cutting edges of the tool and that this flow of fluid is so directed as to continually sweep away from said cutting edges the chips produced during the cutting operation.

It is thought that the invention and its numerous attendant advantages will be fully understood from the foregoing description and it is obvious that numerous changes may be made in the form, construction and arrangement of the parts without departing from the spirit or scope of the invention or sacrificing its attendant advantages, the form herein described being a preferred embodiment for the purpose of exemplifying my invention.

Having thus described my invention, what is claimed as new and is desired to be secured by Letters Patent of the United States is as follows:

1. A rifling tool comprising an elongated stem and a plurality of cutter portions formed in spaced relationship on said stem, each cutter portion comprising an enlargement on the stem and having cylindrical surfaces substantially concentric with respect to the axis of the tool, a surface defining the leading end of the cutter portion and intersecting said cylindrical portions to form cutting edges, and grooves in said cylindrical surfaces extending between said cutting edges and the trailing end of said enlargement, the grooves in one cutter portion being relatively staggered with respect to the grooves in a succeeding cutter portion.

2. A rifling tool comprising an elongated stem and a plurality of cutter portions formed in spaced relationship on said stem, each cutter portion comprising an enlargement on the stem and having cylindrical surfaces substantially concentric with respect to the axis of the tool, a surface defining the leading end of the cutter portion and intersecting said cylindrical portions to form cutting edges, the enlargement forming the cutter portion having surfaces on opposite sides of the cylindrical portion arranged at an inclination with respect to the axis of the stem whereby to impart relative turning movement to the tool with respect to the barrel as it travels the barrel to present the cutting edge against the barrel along the helical path.

3. A rifling tool comprising a plurality of cutter portions formed and positioned on said tool to make cuts of progressively increasing depth in a barrel being rifled to the end that a groove of desired depth may be formed as a result of a single operating stroke of the tool in said barrel, certain of said cutter portions being positioned to form one rifle groove and others of said cutter portions being disposed in position to form a separate rifle groove wherein successive cutter portions are arranged on the stem in relatively inclined relationship thereon so that the groove cut by one of said cutter portions has a predetermined angular displacement in the barrel with respect to the groove formed by the cutting edge of another of said cutter portions.

4. A rifling tool comprising an elongated stem and a plurality of cutter portions formed in spaced relationship on said stem, each cutter portion comprising an enlargement on the stem and having cylindrical surfaces substantially concentric with respect to the axis of the tool, a surface defining the leading end of the cutter portion and intersecting said cylindrical surfaces to form cutting edges, the enlargement forming the cutter portion being relieved to define the opposite ends of said cutting edges and to provide shoulders on opposite sides of the cutting edges and extending rearwardly thereof to form spline means in position to ride in a groove cut in said barrel by said edge, said shoulders being inclined on said stem to impart a turning movement to said tool relative to said barrel as the tool is drawn through the barrel.

FRED BOHLE.

CERTIFICATE OF CORRECTION.

Patent No. 2,210,848. August 6, 1940.

FRED BOHLE.

It is hereby certified that error appears in the printed specification of the above numbered patent requiring correction as follows: Page 1, first column, line 6, for the word "ring" read --rifling--; page 3, first column, line 66, for the reference numeral "57" read --67--; and second column, line 3, for "apppreciable" read --appreciable--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.